United States Patent [19]

Crumby

[11] Patent Number: 4,741,368
[45] Date of Patent: May 3, 1988

[54] RETURNABLE CONTAINER FOR LIQUID CHEMICALS AND FITTING THEREFOR

[75] Inventor: Tom I. Crumby, Greenwood, Miss.

[73] Assignee: FMC Corporation, Philadelphia, Pa.

[21] Appl. No.: 902,908

[22] Filed: Sep. 2, 1986

[51] Int. Cl.$^4$ .............................................. B65B 3/04
[52] U.S. Cl. ...................................... 141/18; 141/59; 141/285; 141/325; 137/587
[58] Field of Search ................ 137/587, 588, 589; 141/325, 326, 327, 285–310, 2, 18–28, 37–66

[56] References Cited

U.S. PATENT DOCUMENTS 3,640,319  2/1972  Hougen .................................. 141/59
3,744,526  7/1973  MacNiel ................................ 141/18
3,913,606  10/1975 Anderson ............................ 137/205
3,916,924  11/1975 McGowan .......................... 141/286
3,976,087  8/1976  Bolton et al. ........................ 141/59
4,254,805  3/1981  Reeder ................................. 141/59

Primary Examiner—Houston S. Bell, Jr.
Attorney, Agent, or Firm—Patrick C. Baker; H. Robinson Ertelt

[57] ABSTRACT

The use of liquid chemical containers in closed chemical applicator systems is made more secure, safe, convenient and cost effective by a fitting which combines a quick connect-disconnect coupler and a vent/fill tube in a single, protected assembly. The fitting eliminates the need for other openings in the containers and renders the containers returnable to distribution points for refill and/or cleaning, thereby avoiding operator contact with the chemical during transfer and minimizing unauthorized access.

18 Claims, 3 Drawing Sheets

RETURNABLE CONTAINER FOR LIQUID CHEMICALS AND FITTING THEREFOR

TECHNICAL FIELD

This invention relates to closed container systems for transporting and dispensing liquid chemicals, and more particularly to systems for storing, transporting and transferring toxic agrichemicals to holding tanks and to spray applicators mounted in aircraft.

BACKGROUND OF THE INVENTION

Because of the need to eliminate the hazards associated with the application of toxic chemicals such as pesticides and herbicides, chemical industry in general and the agricultural chemicals industry in particular have developed closed systems for shipping, transferring and applying chemicals. Typical of agrichemical systems are those described in U.S. Pat. Nos. 3,976,087 to Bolton et al. and 4,254,805 to Reeder. In these systems liquid chemical from a closed feed tank is delivered by vacuum to a holding tank for mixing or diluting or for measurement of desired volumes, the chemical then being transferred by suitable lines to spray applicator apparatus in aircraft.

As shown in the Reeder patent, chemical concentrate in a supply tank is transferred by vacuum through a probe having its tip disposed below the surface of the liquid chemical to a plurality of holding tanks wherein the chemical is appropriately diluted with water for subsequent delivery to spraying apparatus such as may be contained in aircraft. The line from the probe has a conventional "quick connect-disconnect" fitting for convenience in securing the probe line to a movable chassis, upon which are mounted the various holding tanks and lines. The chassis provides convenience in moving the mixing system into position for operation.

Fluid measuring circuits have been devised for use in mixing measured quantities of toxic chemicals supplied from "point-of-sale" containers. In U.S. Pat. No. 3,913,606 to Andersen, for example, a supply container is provided with a ported cover effecting a fluid-tight seal between the container and a conduit to a hermetically sealed holding tank, the tank having a sight gauge to indicate the level of toxic liquid within the tank. A flush valve and conduit connected to the bottom of the tank permits discharge through a conduit to associated tanks for mixing and/or dilution, preliminary to delivery to a spray apparatus. The connections to the supply tank include a bleeder valve for entry of atmospheric pressure into the container as and when desired. A preferred form of valve includes a ball float. The cover of the chemical supply tank is provided with a sleeve around a probe tube for fluidtight coupling of the probe tube conduit between the supply container and the holding tank.

Despite advances in closed container chemical applicator systems, including apparatus and valving design as described, for example, in the foregoing patents and U.S. Pat. Nos. 3,640,319 to Hougen and 3,916,924 to McGowen, considerable risk has persisted due, in part, to use of disposable chemical supply containers or containers designed for cleaning and refill at the application site. Such container and applicator systems, even when intended for closed system use in accordance with governmental regulations, in reality have not satisfied the needs of industry.

SUMMARY OF THE INVENTION

It has now been found that by designing the fitting of a liquid chemical container as a single unit in the manner of the invention, chemicals can be supplied in heavy duty, returnable containers without need for cleaning and refilling by the customer at an application site and with complete avoidance of the hazards associated with disposable containers. By use of the container fitting of the invention, a chemical may be delivered to an application site in a closed, sealed condition and transferred directly to applicator apparatus such as may be mounted in an aircraft, or into an interim holding or measuring tank prior to transfer into the spray apparatus, all without operator contact with the chemical. Upon emptying of the supply container, the container is returned to the distributor where, under carefully controlled conditions, the container is cleansed, if required, and refilled.

In one aspect of the invention, there is provided a fitting for a container of liquid chemical which combines, in a restricted space in the lid of the container, a tubular support member having an open end sealingly mounted in the lid of the container, a closure plate in the opposing end of the tubular support member, a liquid chemical dispensing tube sealingly mounted in the closure plate and extending axially in the tubular support member for contact with liquid chemical in the container, the upper end of the dispensing tube being capped with coupling means for connection to a liquid transfer line, and a vent tube assembly sealingly mounted adjacent the dispensing tube in the closure plate and having a pressure release or pressurization valve which is removable for filling the container with liquid chemical.

In another aspect of the invention the fitting is combined with a suitable container and provides significant advantages in safety (less contamination risk because the fitting eliminates the need for other openings in the container, resulting in more restricted and controlled use of the containers), security (less opportunity and motivation for tampering), convenience (all necessary elements of the fitting are mounted in a small, restricted space, thus contributing to handling ease), and acceptable cost (high quality, returnable containers may now be used, eliminating the hazards and expense of cleaning and/or refill by the customer).

The foregoing and other aspects, features and advantages of the invention will be apparent from the description which follows.

DETAILED DESCRIPTION

Figure 1:
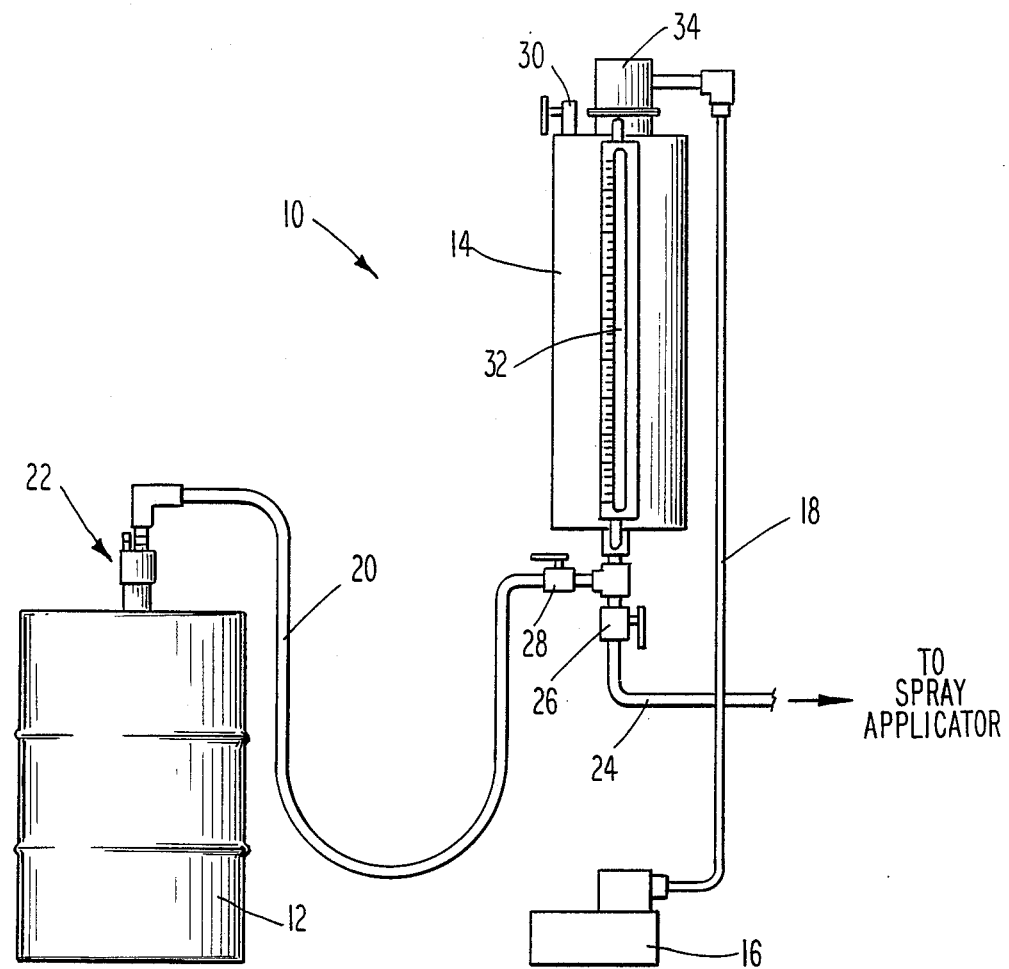
FIG. 1 is a schematic view of a closed container system incorporating a liquid chemical container and fitting of the invention.

With reference to FIG. 1, a typical closed container liquid chemical application system 10 is illustrated. In this system, a high quality, durable container such as a drum 12 formed of stainless steel, optionally glass-lined or enclosing a plastic bottle, supplies chemical to a measuring chamber 14 in response to suction applied by a pump 16 via line 18. The liquid chemical is transferred from drum 12 to chamber 14 through a line 20 and a fitting 22 of the invention. Other components of this typical system include a transfer line 24 to spray applicator apparatus (not shown), suitable control valves 26 and 28 (which may incorporate ball check systems or similar devices for preventing reversed flow of chemical), a vent valve 30 on chamber 14 for restoration of atmospheric pressure as needed, a sight glass 32 mounted vertically on the side of chamber 14 for determining the level of liquid in the chamber, and a housing 34 on the chamber 14 for a float or similar valve for controlling the vacuum and preventing overflow of liquid into the pump 16.

Except for the fitting 22 and the combination thereof with a closed container as represented by drum 12, the components of the closed container system illustrated are conventional and readily available. Optionally, the drum 12 may be a pressurized container, thus eliminating need for pump 16 (except to the extent that the pump may be useful for flushing the chamber 14 and lines 20 and 22 after disconnecting drum 12). For pressurization, an air fitting will be inserted into a wall or the lid of the drum, or the air fitting may be a part of the vent tube assembly described below.

Figure 2:
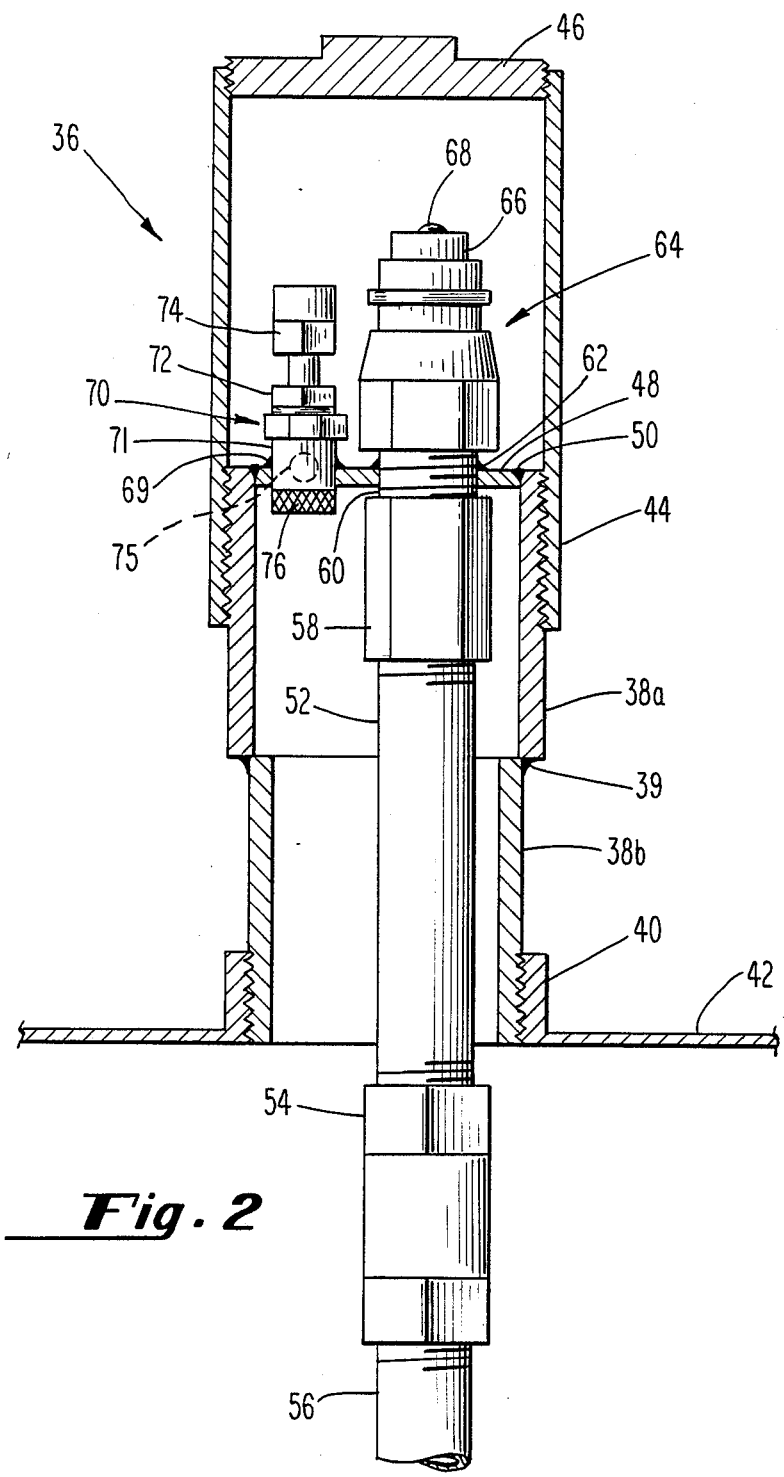
FIG. 2 is a vertical, partially sectioned view of the major portions of one embodiment of a fitting of the invention shown mounted in the lid of a container.

One embodiment of a fitting of the invention is shown in FIG. 2. With reference thereto, the fitting 36 includes a tubular support member here shown in two portions, an upper portion 38a and a lower portion 38b. Portion 38b is threaded on the periphery of its lower, open end for sealing engagement with a correspondingly threaded flange 40 of the container lid 42 of a drum (not shown). Portions 38a and 38b are joined by a weld ferule 39 but they can also be formed integral with one another to constitute a single member. The upper end of the tubular support member 38a may be threaded, as shown, for engagement with a correspondingly threaded tubular cap 44. Cap 44 optionally is provided with a threaded plug 46 for access to the fitting without removing the lower portion of cap 44, for example for inspection or for coupling of a line 20 in a manner to be described.

A cover plate 48 is mounted in the upper, opposing end of tubular support member 38a and, as shown, is welded in place by a weld ferule 50. However, the cover plate may also be mounted by threading or other suitable means or may be formed integral with tubular member 38a.

Mounted axially (concentrically or eccentrically) within the tubular support members 38a and 38b is a dispensing tube 52 shown with a threaded coupler 54 (the coupler optionally containing a check valve, not shown) and a lower extension tube 56 having a length sufficient to maintain its open end below the surface of a liquid chemical in a closed container such as drum 12 of FIG. 1. The upper end of tube 52 is threaded to receive a coupler 58 for connection with a threaded neck member 60 which is received in an opening in cover plate 48 and sealingly affixed therein as by weld ferule 62. A hydraulic coupler assembly 64 is threaded on the neck 60 and includes a crown 66 in which is mounted a spring-loaded ball 68, thus defining the male portion of a conventional "quick coupler" for connection with the female portion of a quick coupler on conduit 20 as schematically indicated in FIG. 1. Equivalent couplers may be substituted for those shown. These include "Pioneer" or "Aeroquip" brand nipple-type couplers and "Emco Wheaton" (J1302/J1401) or "OPW" (1611-A/1711-D) brand dry break-type couplers.

Affixed adjacent to neck 60 in cover plate 48, as by a weld 69, is a vent tube assembly 70 which includes a tubular lower member 71, a lock nut 72 and a vacuum breaker head 74 threaded into nut 72. Tubular member 71 has an interior chamber 75 (shown in outline) of any suitable configuration for passage of air or liquid through assembly 70, optionally filtered by a filter screen 76. The assembly 70 has several functions. The first is to provide good seal of the total fitting 36 during removal of liquid chemical under suction or pressure from a container having a lid 42 via the dispensing tube 52 and its extensions. The assembly also permits venting of the container and filling after transfer of liquid chemical. Finally, one or both of elements 72 and 74 may be unscrewed to provide a port through member 71 for refill of the container or for other purposes such as insertion of a dip stick for measuring the amount of chemical remaining in the container, all without removing the total fitting 36 from the container. Of course, for good cleaning of the container or for quicker refill, it will usually be desirable to unscrew the entire fitting 36 from flange 40 on lid 42. The vent tube assembly may also include an air fitting valve (not shown), as a replacement for the vacuum breaker head 74, for pressurization of drum 12 if the chemical is to be transferred under pressure.

Figures 3, 4:
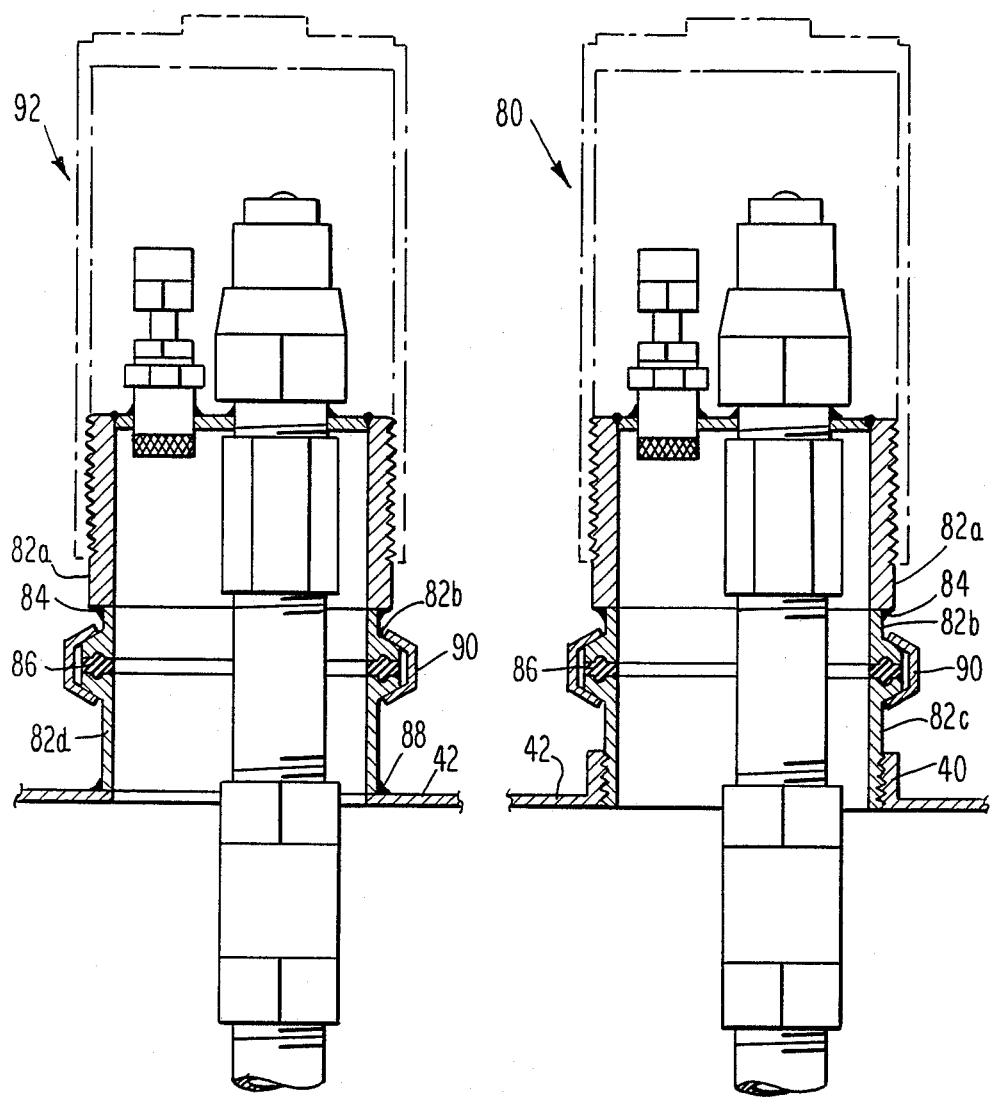
FIGS. 3 and 4 are views similar to FIG. 2 showing other embodiments of fittings of the invention.

For additional efficiency and convenience, other embodiments of the fitting are illustrated in FIGS. 3 and 4 wherein the elements, parts and features are the same as in FIG. 2 except as follows. The embodiment of fitting 80 shown in FIG. 3 includes a tubular support member having an upper portion 82a and a lower portion 82b but further including a still lower, separate section 82c threadably engagable with the flange 40 of container lid 42. The two portions 82a and 82b are shown affixed together by a weld ferule 84 but the two portions can also be formed integrally as a single section, if desired. Sections 82b and 82c of the tubular support member are sealingly connected together by means of a gasket 86 and clamping means such as a conventional circular clamp 90 of which the so-called "tri-clamp" is representative. Preferably the gasket 86 will be formed of a resilient, chemical resistant rubber such as Buna-N rubber or commercially available Viton ® fluoroelastomer or Teflon ® fluorocarbon materials.

Still another embodiment 92 of a conveniently removable fitting of the invention is shown in FIG. 4. Here, the tubular support member of the fitting has the same configuration as in FIG. 3 except that the lower section 82d of the support member is affixed to the lid 42 as by weld ferule 88 rather than threadably engaged as in FIG. 3. This embodiment, while reducing the modes of access to the container, nevertheless improves safety because it eliminates one source of possible loose connection between the fitting and the lid 42 of the container.

The various components of the fittings 36, 80 and 92 may be formed of any suitable materials depending on the type of liquid chemical and pressure/temperature requirements. For durability, metals such as stainless steel, brass and galvanized steel are preferred, including combinations thereof, but plastics can be used in some cases. Also, auxiliary gaskets and O-rings can be used for improved sealing as required.

In use and operation as a vacuum system, with reference to FIGS. 1 and 2, valve 26 of the measuring chamber and the vent tube assembly 70 are closed. Line 20 is connected between the coupler assembly 64 and control valve 28, and suction line 18 from pump 16 is connected to the housing 34 on the top of chamber 14. With valve 30 closed and valve 28 open, suction is applied and chemical is drawn from drum 12 to a height in chamber 14 determined from sight glass 32. Valve 28 and the valve in housing 34 are closed and the vacuum pump stopped. Valve 30 is then opened to restore atmospheric pressure to chamber 14 and valve 24 is opened to transfer a measured amount of chemical to a spray applicator or to a holding tank therefor. When drum 12 is empty, line 20 is disconnected and drum 12 is returned to a distribution point for refill.

As thus conceived and constructed, the various embodiments of the fitting eminently satisfy the objectives of safety, security, convenience and acceptable cost. In particular, the combination of a quick coupler and vent pressure tube—liquid chemical access assembly into a single unit engagable in a single opening in a liquid chemical container eliminates or reduces the possibility of contamination or hazardous contact that sometimes occurs with chemical containers of the more conventional design, usually having a fitting for dispensing the chemical and one or more other openings for refill and/or cleaning. By reducing the openings in the container to a single opening represented by the aperture in the container lid in which the fitting of the invention seats or is mounted, by controlling access to the fitting by a protective cap (such as cap 44 of FIG. 2), and optionally by use of a seal (such as a lead seal), a closed container is provided the use of which can be carefully monitored from the point of filling and shipping to the site of application, and then back to the source for refill and/or cleaning as required. Thus the customer can be assured of substantially reduced risk of operator contact with the chemical, and governmental regulations concerning closed container systems for transfer of liquid chemicals are more efficiently and economically satisfied.

While the invention has been illustrated and described in what are considered to be the most practical and preferred embodiments, it will be recognized that many variations are possible and come within the scope and spirit thereof, the appended claims therefor being entitled to a full range of equivalents.

What is claimed is:

1. A fitting for mounting in the lid of a closed container for dispensing liquid chemical therefrom, comprising the combination of:
    a tubular support member having an open end adapted on the periphery thereof for sealing engagement with the lid;
    a closure plate in the opposing end of the tubular support member;
    a liquid chemical dispensing tube sealingly mounted in the closure plate and extending axially in the tubular support member for contact with liquid chemical in the container;
    coupling means capping the upper end of the dispensing tube for connection to a liquid transfer line; and
    a vent tube sealingly mounted adjacent the dispensing tube in the closure plate and having a pressure relief or pressurization valve which is removable for filling the container with liquid chemical.

2. The fitting of claim 1 wherein the vent tube assembly includes a filter screen for filtering chemical admitted to the container.

3. The fitting of claim 1 wherein the open end of the tubular support member is threaded for sealing engagement with a correspondingly threaded opening in the lid of the container.

4. The fitting of claim 1 wherein the tubular support member comprises an upper section including the closure plate and a lower section, the lower periphery of the lower section being sealingly engaged with the lid of the container, and further including clamping means connecting the sections together.

5. The fitting of claim 4 wherein the lower section is threaded on its lid-engagement end for sealing engagement with a correspondingly threaded opening in the lid.

6. The fitting of claim 4 wherein the lower periphery of the lower section is welded to the lid.

7. The fitting of claim 1 wherein the coupling means comprises a hydraulic coupler including a spring-loaded ball coupler for connection to a suction hose.

8. The fitting of claim 1 further including a removable protective cap adapted for sealing engagement with the tubular support member.

9. The fitting of claim 8 wherein the protective cap and tubular support member are threaded.

10. The combination of a closed container for dispensing liquid chemical and a fitting mounted in the lid of the container, said fitting comprising:
    a tubular support member having an open end adapted on the periphery thereof for sealing engagement with the lid;
    a closure plate in the opposing end of the tubular support member;
    a liquid chemical dispensing tube sealingly mounted in the closure plate and extending axially in the tubular support member for contact with liquid chemical in the container;
    coupling means capping the upper end of the dispensing tube for connection to a liquid transfer line; and
    a vent tube assembly sealingly mounted adjacent the dispensing tube in the closure plate and having a pressure relief or pressurization valve which is removable for filling the container with liquid chemical.

11. The combination of claim 10 wherein the vent tube assembly includes a filter screen for filtering chemical admitted to the container.

12. The combination of claim 10 wherein the open end of the tubular support member is threaded for sealing engagement with a correspondingly threaded opening in the lid of the container.

13. The combination of claim 10 wherein the tubular support member comprises an upper section including the closure plate and a lower section, the lower periphery of the lower section being affixed in sealing engagement with the lid of the container, and further including clamping means connecting the sections together.

14. The combination of claim 13 wherein the lower section of the tubular support member is threaded on its lid-engagement end for sealing engagement with a correspondingly threaded opening in the lid.

15. The combination of claim 13 wherein the lower periphery of the lower section is welded to the lid.

16. The combination of claim 1 wherein the coupling means comprises a hydraulic coupler including a spring-loaded ball coupler for connection to a suction hose.

17. The combination of claim 1 further including a removable protective cap adapted for sealing engagement with the tubular support member.

18. The combination of claim 17 wherein the protective cap and tubular support member are threaded.

* * * * *